US005469018A

United States Patent [19]

Jacobsen et al.

[11] Patent Number: 5,469,018

[45] Date of Patent: Nov. 21, 1995

[54] RESONANT MICROCAVITY DISPLAY

[75] Inventors: Stuart M. Jacobsen; Steven M. Jaffe; Hergen Eilers, all of Athens; Michieal L. Jones, Winterville, all of Ga.

[73] Assignee: University of Georgia Research Foundation, Inc., Athens, Ga.

[21] Appl. No.: 94,767

[22] Filed: Jul. 20, 1993

[51] Int. Cl.[6] .................................................. H01S 3/08

[52] U.S. Cl. .......................... 313/461; 313/466; 313/474; 372/92

[58] Field of Search .................................... 313/461, 466, 313/474, 506, 509

[56] References Cited

U.S. PATENT DOCUMENTS

| | | | |
|---|---|---|---|
| 4,298,820 | 11/1981 | Bongers et al. | 313/463 |
| 4,539,687 | 9/1985 | Gordon et al. . | |
| 4,642,695 | 2/1987 | Iwasaki | 358/237 |
| 4,695,732 | 9/1987 | Gordon et al. . | |
| 4,695,762 | 9/1987 | Berkstresser et al. . | |
| 4,937,661 | 6/1990 | Van der Voort | 313/474 |

(List continued on next page.)

FOREIGN PATENT DOCUMENTS

| | | | |
|---|---|---|---|
| 2000173A | 1/1979 | United Kingdom | C09K 11/00 |

OTHER PUBLICATIONS

Mauch, et al., "Optical Behaviour of Electroluminescent Devices", *Springer Proceedings in Physics*, vol. 38, pp. 291–295 (1989).

Vlasenko, et al., "Interference of Luminescent Emission from an Evaporated Phosphor", *Opt. Spect.*, vol. 11, pp. 216–219 (1961).

Vlasenko, et al., "Investigation of Interference Effects in Thin Electroluminescent ZnS–Mn Films", *Opt. Spect.*, vol. 28, pp. 68–71 (1970).

Poelman, et al., "Spectral Shifts in Thin Film Electroluminescent Devices: An Interference Effect", *J. Phys. D: App. Phys.*, vol. 25, pp. 1010–1013 (1992).

R. T. Tuenge, "Current Status of Color TFEL Phosphors," *Electroluminescence—Proceedings of the Sixth International Workshop on Electroluminescence,* El Paso, Tex., 173–177 (1992).

Plasma Display Manufacturers of the American Display Consortium, "Recommended Research Topics on Plasma Display for the DARPA Sponsored Phosphor Center of Excellence," 1–2 (1993).

Y. Yamamoto et al., "Optical Processes in Microcavities," *Physics Today,* 66–73, Jun. 1993.

E. F. Schubert, et al., "Giant Enhancement of Luminescence Intensity in Er–doped Si/$SiO_2$ Resonant Cavities," *Appl. Phys. Lett.* vol. 61, No. 12, 1381–83 (1992).

H. Yokoyama, "Physics and Device Applications of Optical Microcavities," *Science,* vol. 256, 66–70 (1992).

S. Haroche et al., "Cavity Quantum Electrodynamics," *Scientific American,* 54–62, Apr. (1993).

S. W. Depp, et al., "Flat Panel Displays," *Scientific American,* 90–97, Mar. (1993).

D. T. C. Huo et al., "Reticulated Single–Crystal Luminescent Screen," *J. Electrochem. Soc.,* vol. 133, No. 7, (1986).

E. A. Hinds, "Spectroscopy of Atoms in a Micron–Sized Cavity," (date and periodical title unknown), 18–19.

*Primary Examiner*—Sandra L. O'Shea
*Assistant Examiner*—Vip Patel
*Attorney, Agent, or Firm*—Needle & Rosenberg

[57] ABSTRACT

A resonant microcavity display, comprising a thin-film resonant microcavity with a phosphor active region is disclosed. The microcavity comprises: a rigid substrate; a front reflector disposed upon the rigid substrate; a phosphor active region disposed upon the front reflector; and a back reflector disposed upon the active region. The display preferentially emits light that propagates along the axis perpendicular to plane of the display, due to its quantum mechanical properties. It exhibits high external efficiency, highly controllable chromaticity, high resolution, highly directional output and highly efficient heat transfer characteristics. For these reasons it provides a suitable display element for projection screen television, high definition television, direct view television, flat panel displays, optical coupling, and other applications.

31 Claims, 10 Drawing Sheets

U.S. PATENT DOCUMENTS 4,995,043 2/1991 Kuwata et al. .............................. 372/7
5,089,860 2/1992 Deppe et al. .
5,126,626 6/1992 Iwasaki .............................. 313/466 X
5,137,598 8/1992 Thomas .............................. 156/655
5,226,053 7/1993 Cho et al. .............................. 372/45
5,289,018 2/1994 Okuda et al. .............................. 257/98
5,363,398 11/1994 Glass et al. .............................. 372/92

RESONANT MICROCAVITY DISPLAY

BACKGROUND OF THE INVENTION

1. Field of the Invention

The present invention relates to a luminescent screen comprising a resonant microcavity having a phosphor active region.

2. Description of the Prior Art

Conventional cathode ray tube (CRT) displays work by projecting electrons from an electron gun, which accelerates them by passing them through an intense electrical field, onto a screen coated with a phosphor material in the form of a powder. The high-energy electrons excite luminescence centers in the phosphors which emit visible light uniformly in all directions. CRT's are well established in the prior art and are commonly found in television picture tubes, computer monitors and many other devices.

Displays using powder phosphors suffer from several significant limitations, including: low directional luminosity (i.e,, brightness in one direction) relative to the power consumed; poor heat transfer and dissipation characteristics; and a limited selection of phosphor chromaticities (i.e., the colors of the light emanating from the excited phosphors).

The directional luminosity is an important feature of a display because its directional properties influence the efficiency with which it can be effectively coupled to other devices (e.g., lenses for projection CRT's). The normal light flux pattern observed from a luminescent screen closely follows a "Lambertian distribution"; i.e., light is emitted uniformly in all directions. For direct viewing purposes this is desirable, as the picture can be seen from all viewing angles. However, for certain applications a Lambertian distribution of the light flux is inefficient. These applications include projection displays and the transferring of images to detectors for subsequent image processing.

Heat transfer and dissipation characteristics are important because one of the limiting factors in obtaining bright CRT's suitable for large screen projection is the heating of the phosphor screen. As the incident electron beam density increases, the phosphor temperature increases. When the phosphor reaches a certain temperature, its luminosity decreases. This is known as thermal quenching. With conventional powder-phosphor displays the phosphor-to-screen heat transfer characteristics are relatively poor, therefore heat dissipation is limited and thermal quenching can occur at relatively low beam densities. Because projection displays require high beam densities to produce the brightness required to project an image, this inefficiency makes conventional CRT's poorly suited for projection displays.

Chromaticity is important because the faithful reproduction of colors in a display requires that the three primary-color phosphors (red, green and blue) conform to industry chromaticity standards (e.g., European Broadcasting Union specifications). Finding phosphors for each of the three primary colors that exactly match these specifications is one of the most troublesome aspects of phosphor development.

The decay time of the activator (i.e., light emitting ion in the phosphor) is also another important parameter for a phosphor. In an ideal phosphor for high brightness applications, it is desirable to control directly the decay time of the phosphor for each display application. This allows rapid re-excitation of the activator with a corresponding increase in the maximum light output. The decay time is given by the natural spontaneous transition rate of the activator. In order to improve phosphor performance it is therefore desirable to have control over this spontaneous transition rate.

Another problem encountered in conventional phosphor displays is that energy can transfer from one activator to another nearby activator in the phosphor host matrix. This is a nonradiative process where the efficiency of the phosphor is reduced. The energy transfer is strongly dependent on activator concentration and therefore it limits the density of activators that can be incorporated in a display and thus the maximum light output.

The use of a single-crystal, thin-film phosphor as a faceplate for a CRT was first described in a British patent application by M. W. Van Tol, et al., UK Pat. GB-2000173A (1980). This patent taught the use of an yttrium aluminum garnet $Y_3Al_5O_{12}$ (YAG) film grown by liquid phase epitaxy (LPE) on a single-crystal YAG substrate. The YAG film is doped with a rare-earth ion which emits light when excited by electrons. (Doping is the process wherein dopant ions are substituted for host ions in the crystal lattice during crystal growth.) In this device, the thickness of the thin-film layer is from one to six microns and does not bear any relation to the wavelength of the light to be emitted by the display.

This device exhibited several advantages over conventional powder-phosphor displays. One such advantage was that heat was transferred from the phosphor more efficiently because of the perfect contact between the phosphor and the screen, and because of the high thermal conductivity of the YAG substrate. The screen could be loaded with a higher beam density without exhibiting thermal quenching and, therefore, could produce more light.

Another advantage of single-crystal phosphor luminescent screens versus powder deposited luminescent screens is concerned with the resolution of a pixel (i,e., light producing spot). For high resolution displays using powder phosphor, the limiting size of a pixel—and hence the resolution of the screen—is determined by the particle size of the phosphor powder. Single-crystal phosphors, on the other hand, are not affected by this since they do not contain discrete particles, but have a homogeneous distribution of phosphor ions substituted in the host lattice instead.

Powder phosphors further reduce resolution due to the light scattering from the surface of the powder. Because of the lack of discrete phosphor particles and the absence of light scattering, thin-film displays have high image resolution, limited only by the spot size of the exciting electron beam. The increasing demand for higher resolution displays makes this a particularly attractive advantage.

Yet another advantage is concerned with producing a vacuum in a CRT. To allow the electron beam to travel between the electron gun and the phosphor screen, a vacuum must be maintained within a CRT. Conventional powder phosphors have a high total surface area and, generally, organic compounds are used in their deposition. Both the high surface area and the presence of residual organic compounds cause problems in holding and maintaining a good vacuum in the CRT. Using thin-film phosphors overcomes both of these effects, as the total external surface area of the tube is controlled by the area of the thin-film (which is much less than the surface area of a powder phosphor display) and, furthermore, there are no residual organic compounds present in thin-film displays to reduce the vacuum in the sealed tube.

The thin-film phosphors of Van Tol, et al., exhibit one prohibiting disadvantage, however, due to the phenomenon of "light piping." Light piping is the trapping of light within the thin-film, rendering it incapable of being emitted from the device. This is caused by the total internal reflection of the light rays generated within the thin-film. Since the index of refraction (n) of most phosphors is around n=2, only those light rays whose incident angles are less than the critical angle, $\theta_c$ (where $\sin \theta_c=1/n$) will be emitted from the front of the thin-film. The critical angle for an n=2 material is around 30° . Therefore, the fraction of light that escapes from the front of the thin-film is only about 6.7% of the total light. The common design of placing a highly reflective aluminum layer behind the film only doubles the output to about 13% of the light. Moreover, this light is spread in a "Lambertian distribution" and is not directional. As a result of light piping, the external efficiency (i.e., the percentage of photons escaping from the display relative to all photons created in the display) is less than one-tenth that of powder phosphor displays. Therefore, in spite of the unique advantages offered in terms of thermal properties, resolution, and vacuum maintenance; the development of commercial CRT devices based on thin-films is held back by their poor efficiency due to "light piping".

Some schemes have been designed to reduce the "light piping" problem. One scheme described by Bongers, et al., U.S. Pat. No. 4,298,820 (1981), uses a thin-film, deposited by LPE, with V-shaped grooves etched into the surface to reflect light out of the thin-film. This approach brought about an improvement in external efficiency of around 1 ½ to 2 ½ times that of a thin-film display without the V-shaped grooves. Given the previous external efficiency of 13%, this would still only lead to a total external efficiency of around 20% to 30%.

Another scheme, described by Huo and Hou, "Reticulated Single-Crystal Luminescent Screen" 133 J. Electrochem. Soc. 1492 (1986), involves etching individual mesa shapes onto the thin-film deposited by LPE. This led to a three times improvement in external efficiency (still rendering only about a 30% external efficiency). Furthermore, since the phosphor layer was no longer, strictly speaking, a thin-film, any light rays that were internally reflected could find themselves rescattered to areas far from their point of creation, thus spoiling the resolution of the display.

Microcavity resonators, which are incorporated in the present invention, have existed for some time and have recently been described by H. Yokoyama, "Physics and Device Applications of Optical Microcavities" 256 Science 66 (1992). Microcavities are devices which have the ability to control the decay rate, the directional characteristics and the frequency characteristics of luminescence centers located within them. The changes in the optical behavior of the luminescence centers involve modification of the fundamental mechanisms of spontaneous and stimulated emission. Physically, microcavities are optical resonant cavities with dimensions ranging from less than one wavelength of light up to tens of wavelengths. These are typically formed as one integrated structure using thin-film technology. Microcavities involving planar, as well as hemispherical, reflectors have been constructed for laser applications.

Resonant microcavities with semiconductor active layers, for example silicon or GaAs, have been developed as semiconductor lasers and as light-emitting diodes (LEDs).

E. F. Schubert, et al., "Giant Enhancement of Luminescence Intensity in Er-doped $Si/SiO_2$ Resonant Microcavities" 61(12) Appl. Phys. Lett. 1381 (1992), describes a resonant microcavity with an Er doped $SiO_2$ active layer. This device emits radiation in the infrared region and is intended as a laser amplifier for fiber-optic communications.

The Schubert device, the semiconductor lasers and the

LEDs are unsuitable for use in luminescent displays for several reasons. They contain luminescent materials such as Si, GaAs, etc., in the active region which are suitable as laser media, but which are inefficient emitters of visible light. They also are designed with small planar surface areas that are inadequate for display purposes. Moreover, because of the design of these devices and the active materials used, they cannot be excited efficiently with electron bombardment, an electric field, or ultraviolet radiation. These excitation mechanisms are an essential part of the current display technologies.

Furthermore, the laser microcavity devices work above the laser threshold, which means that their response to excitation is inherently nonlinear and their brightness is limited to a narrow dynamic range. Displays, conversely, require a wide dynamic range of brightness. Microcavity lasers are also unsuitable for use in displays because the laser light they produce is highly coherent. Highly coherent light exhibits a phenomenon called speckle. When viewed by the eye, highly coherent light appears as a pattern of alternating bright and dark regions of various sizes. To produce clear, images, luminescent displays must produce incoherent light.

SUMMARY OF THE INVENTION

The subject invention, the Resonant Microcavity Display (RMD), is a luminescent display which uses a thin-film phosphor (with all of its above-cited advantages) without exhibiting the light piping problem. This is because it emits light in a highly directional manner as a result of its microcavity geometry.

The RMD is a microcavity resonator comprising an active region comprising a phosphor sandwiched between two reflectors, all of which are grown on a transparent rigid substrate. The width of the active region is chosen such that a resonant standing wave, of the wavelength to be emitted, is produced between the two reflectors. In its simplest form, a planar microcavity, the two reflectors are parallel to each other and the plane of the active region is parallel to the reflectors. Other geometries, such as confocal or hemispherical microcavities, are also possible.

Fabricating the RMD requires the use of a thin film growing technique capable of controlling layer thickness to a precision of several nanometers. Such techniques include chemical vapor deposition (CVD), molecular beam epitaxy (MBE), atomic layer epitaxy (ALE) or sputtering.

The substrate materials can be either a crystalline or an amorphous solid. It can be made of any material that will allow the other regions to be grown on it. Suitable substrate materials may be chosen from a wide range of materials such as oxides, fluorides, aluminates, and silicates. The criteria involved in selecting a substrate material include its thermal conductivity and its compatibility (both physical and chemical) with other materials forming the RMD.

The phosphor may be excited through several means, including: bombardment by externally generated electrons (cathodoluminescence), excitation by electrodes placed across the active layer to create an electric field (electroluminescence), or excitation using photons (photoluminescence).

The present invention is distinguished from other microcavity devices in part by the placing of a phosphor in the resonant microcavity. Phosphors are materials that exhibit superior visible luminous efficiencies (where luminous efficiency, as used herein, is defined as the ratio of light output in lumens over the power input in watts). Typically, the luminous efficiencies of phosphors range between 1% and 20%.

The active region may comprise a wide range of phosphors (e.g., sulfides, oxides, silicates, oxysulfides, and aluminates) most commonly activated with transition metals, rare earths or color centers. A selection of phosphors that have found commercial applications, and from which an application dependent phosphor can typically be selected for use in the present invention, is documented in "Optical Characteristics of Cathode Ray Tube Screens," Electronic Industries Association Publication TEP 116.

The reflectors forming the resonant cavity consist of either metallic layers or Bragg reflectors. Bragg reflectors are dielectric reflectors formed from alternating layers of materials with differing indices of refraction. The simplest geometry for dielectric reflectors consists of one-quarter wavelength thick layers of a low refractive index material, such as a fluoride or certain oxides, alternating with one-quarter wavelength thick layers of a high refractive index material, such as a sulfide, selenide, nitride, or certain oxides.

Because of the geometric design of the RMD, a resonant standing wave is produced which, through constructive interference, increases the emission of light in the forward direction—the direction perpendicular to the plane of the active layer. The amount of light emitted in directions other than perpendicular to the active layer is decreased because there is destructive interference in these directions. The exact properties of the RMD may be calculated using quantum electrodynamics (QED).

In current display applications, only one side of the screen is viewed. This design requires the use of asymmetric reflectors in order for most of the light to be projected towards the viewer. This asymmetry is obtained by having one of the two reflectors be substantially wholly reflective, meaning that it reflects most of the light impinging on it. The other reflector (opposite to the substantially wholly-reflective reflector) is partially reflective, meaning that it does not reflect as high of a percentage of impinging light as the wholly-reflective reflector and allows some of the light to pass through it. Because of the difference in reflectance of the two reflectors, virtually all of the light produced in the active region escapes through the partially-reflective reflector along the axis normal to the plane of the device.

The microcavity dimensions depend on the natural spontaneous emission spectrum of the phosphor being used, as observed outside of a cavity. If the spectrum covers a broad range of visible wavelengths it is possible to choose an appropriate part of the spectrum (i.e., one that matches an industry standard chromaticity) and construct the microcavity with a matching resonance. The final chromaticity of the RMD will correspond to the cavity resonance and will be different from the natural chromaticity of the phosphor outside of the microcavity. Conversely, if the phosphor's natural spontaneous emission spectrum covers only a narrow range of visible wavelengths, the dimensions would be chosen so that the cavity resonance would match one of the phosphor's emission bands.

The RMD has a highly directional light output similar to those of a projector or a flashlight. This allows highly efficient coupling to other devices. RMD's also have a high external efficiency, approaching 100%, which makes them especially suitable for use in projection CRT displays.

It is therefore an object of this invention to provide a thin-film luminescent display that does not exhibit the problem of light piping.

It is a further object of this invention to provide a luminescent display with highly efficient heat transfer properties.

It is a further object of this invention to provide a luminescent display with a high external efficiency.

It is a further object of this invention to provide a luminescent display with high resolution.

It is a further object of this invention to provide a luminescent display which produces a highly directional output.

It is a further object of this invention to provide a luminescent display in which the chromaticity of the emitted light can be accurately controlled irrespective of the nature of the phosphor used.

It is a further object of this invention to provide a luminescent display wherein the phosphor used can be chosen to optimize the display with respect to properties other than chromaticity.

It is a further object of this invention to provide a luminescent display wherein the decay time of the activator can be tailored for the specific display application.

It is a further object of this invention to provide a luminescent display which can be heavily loaded by an intense electron beam without saturating the phosphor due to overheating.

Other objects and advantages of the present invention will become apparent to those skilled in the art from the following detailed description of the illustrated embodiments, when read in light of the accompanying drawings.

FIG. **8*a*** is a drawing of an array of pixel-sized microcavities as used in a color television.

FIG. **8*b*** is a drawing of a front view of an array of pixel-sized microcavities as used in a color television.

Figure 9:
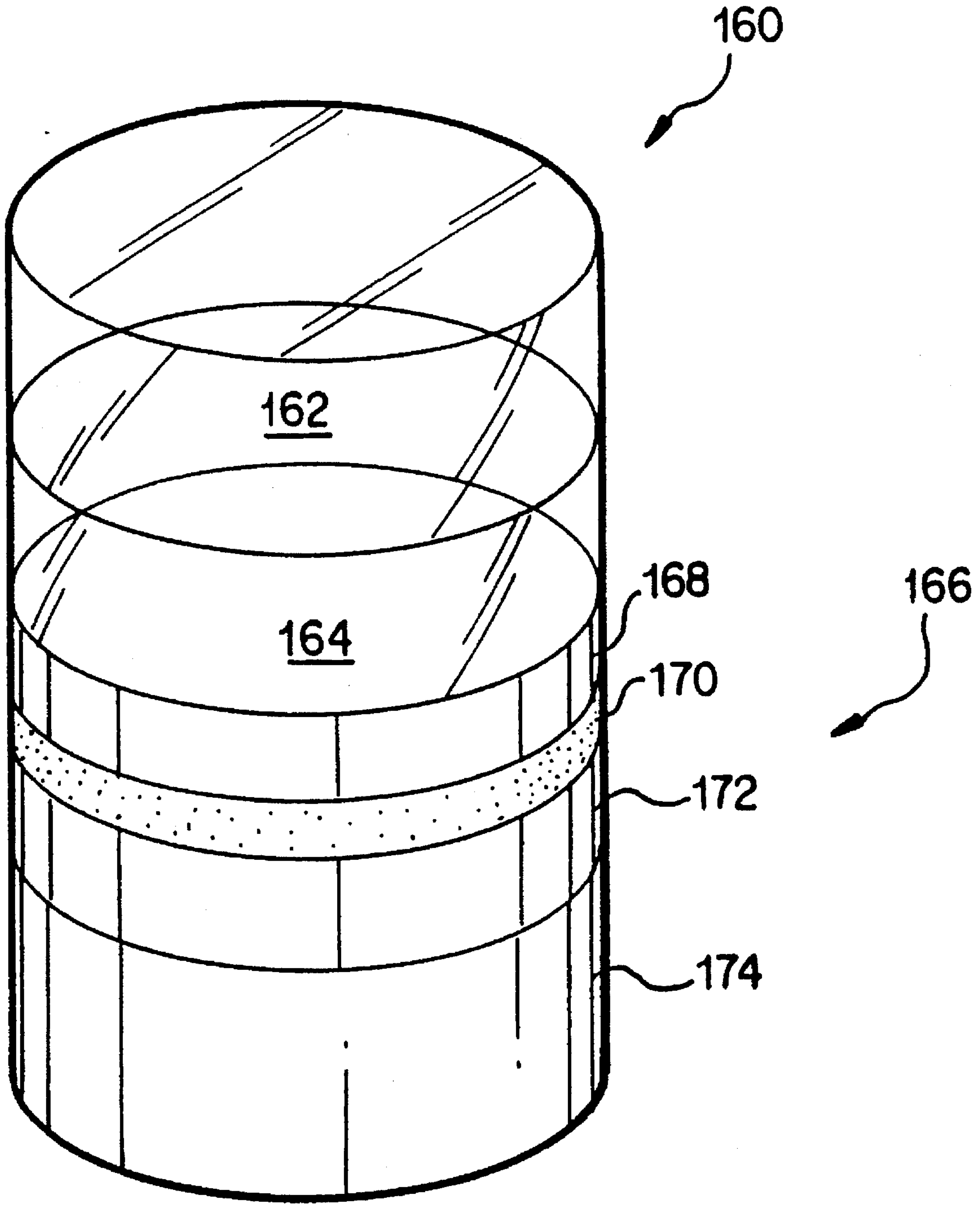

FIG. 9 is a drawing of an RMD excited by an electric field.

Figure 10:
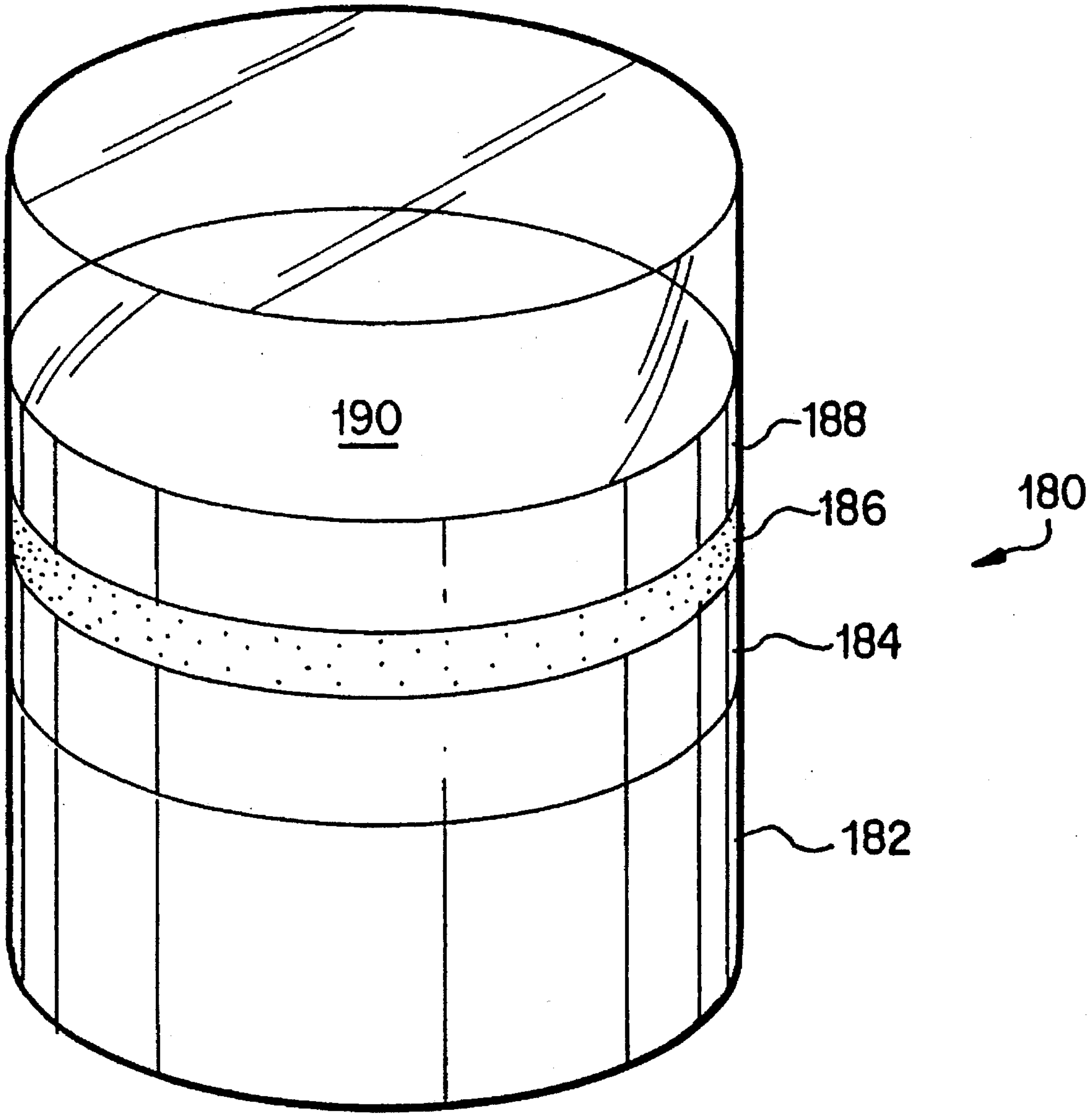

FIG. 10 is a drawing of an RMD excited with ultra-violet light.

DETAILED DESCRIPTION OF THE INVENTION

The present invention employs quantum electrodynamic (QED) theory to enhance the properties of the light emitted from phosphor based luminescence displays. The performance of a given display application depends on properties of the emitted light such as the chromaticity, direction, and flux. These properties can be optimized by employing the QED theory to control the spontaneous emission characteristics of the phosphor activator for each specific display application.

Figure 1:
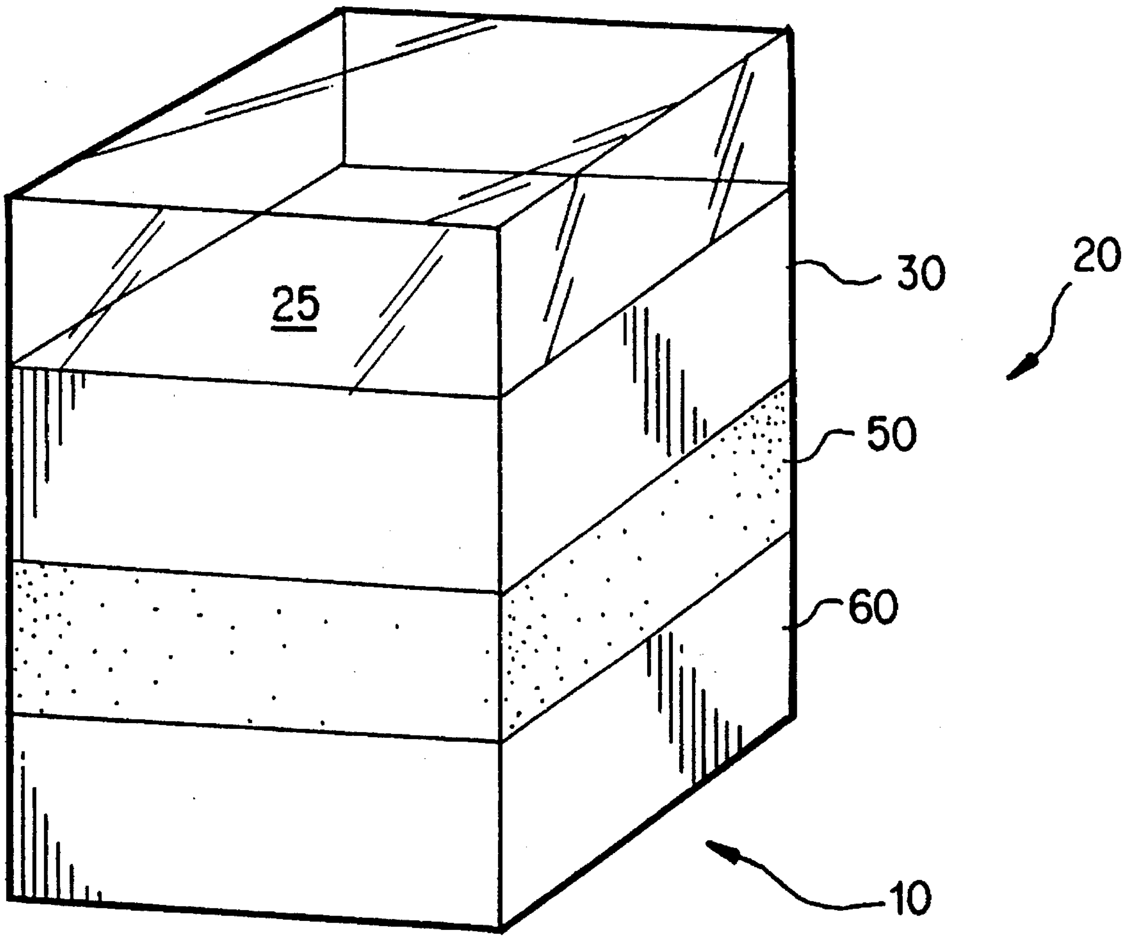
FIG. 1 is a drawing of an RMD using a planar mirror resonator.
Figure 2:
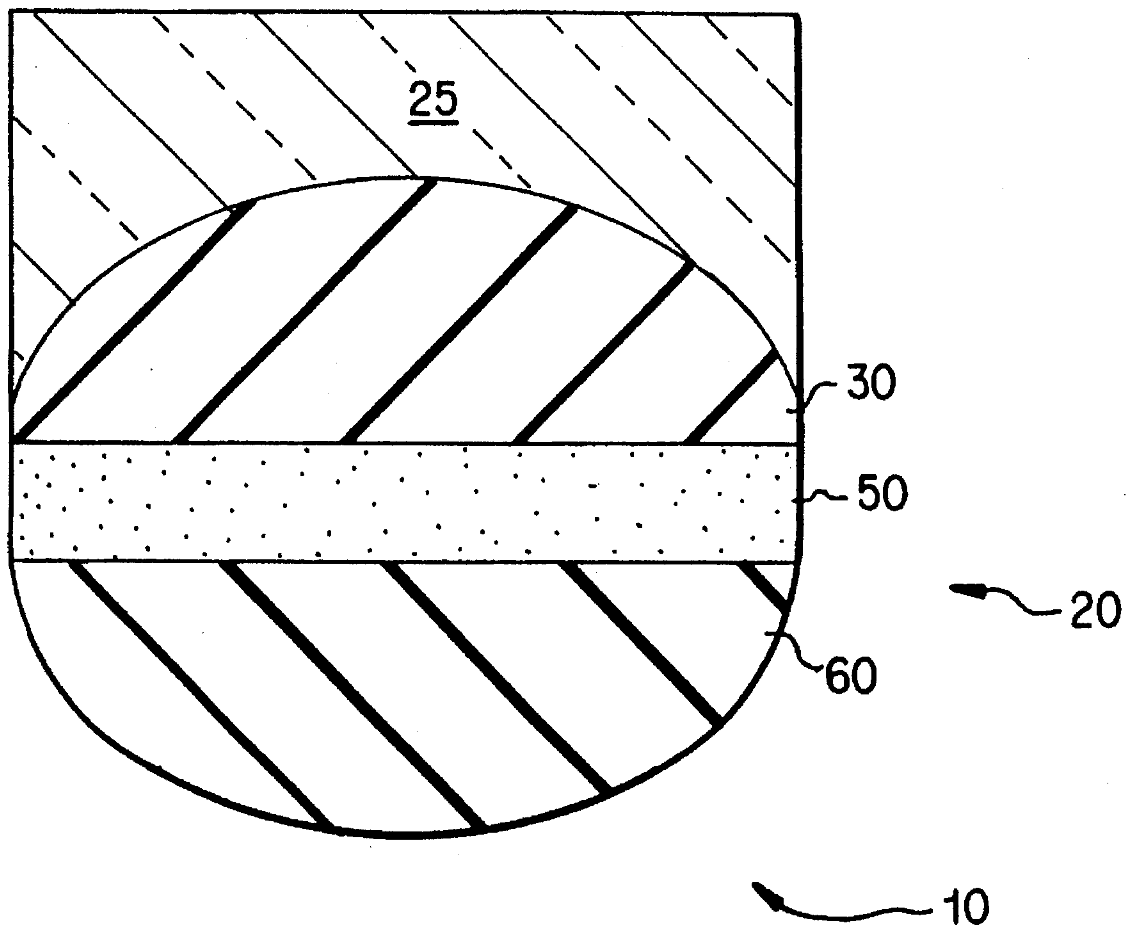
FIG. 2 is a drawing of an RMD using a confocal resonator.

As seen in FIG. 1, the present invention 10, common to all RMD applications, comprises a phosphor embedded in a resonant microcavity 20 grown on a substrate 25. The microcavity 20 further comprises a front reflector 30, a phosphor-based active region 50, and a back reflector 60. The active region 50 is disposed between two reflectors 30 and 60. The structure may comprise a variety of materials and may employ a variety of resonator designs. FIG. 1 illustrates a planar mirror design, whereas FIG. 2 illustrates the present invention configured in a confocal mirror design. The confocal design has the advantage of having an inherently higher cavity quality factor (Q).

The invention can only be completely understood by employing quantum electrodynamic (QED) theory as applied to a cavity. Cavity QED calculations allow one to determine the following parameters for a given degree of activator excitation and activator concentration: the amount of light emitted from the microcavity; the angular spread of the light emitted; and the color of the light emitted.

The calculation begins by determining the nature of the electromagnetic field inside and outside of the cavity. This field calculation uses Maxwell's equations with the boundary conditions imposed by the microcavity. Applying Fourier analysis, the net electromagnetic field is broken down into its fundamental constituents, the optical modes.

An optical mode is a field with a characteristic frequency, direction and polarization. The square of the field intensity corresponds to the actual amount of light. One must select from this field distribution those optical modes that correspond to useful light. For a display, useful light is defined as any light emitted from the cavity within a certain predetermined angular spatial distribution and predetermined frequency spread, regardless of polarization.

The next step is to calculate the amount of light emitted by each activator. This calculation begins by determining the radiative decay rate of each activator for each possible optical mode. The radiative decay consists of a spontaneous emission rate and a stimulated emission rate. The resonant microcavity display, however, only operates as a display when there is no stimulated emission (i.e., constructing a microcavity to operate as a laser would preclude using it as a display). The degree of excitation, the type and concentration of the activators and the resonator design determines when stimulated emission is an issue.

The spontaneous emission rate is determined by using QED theory to calculate the probability that a single excited activator will decay into a specific optical mode. This calculation must use the field strength appropriate for the location of the activator in the cavity. The standing wave established between the two reflectors will have different values throughout the phosphor layer. In addition, a certain probability exists that each excited activator will decay without emitting light. To calculate this non-radiative rate, one must consider cavity QED effects as they apply to the physical mechanism responsible for the non-radiative decay.

For a given excitation level, one can now calculate the amount of spontaneous emitted light for each activator. The ratio of the spontaneous rate to the sum of the radiative and non-radiative rates yields the percentage of excitation that will produce light. The amount of useful light is then determined by calculating the amount of the spontaneous emission in the desired optical modes. This calculation is performed for each activator. Finally, the sum of all the activator contributions yields the display intensity of the RMD.

The properties of the RMD that can be controlled include the chromaticity, the directionality of the display, the luminous efficiency and the maximum light output of the display. These properties are tuned according to the requirements of the specific luminescent screen application. The parameters that must be considered for optimization are the microcavity Q, the microcavity resonance frequency, the asymmetry of the reflectors, the resonator design (i.e., planar, confocal, etc.), the phosphor, the thickness of the phosphor layer, the surface area of the microcavity and the excitation source. These parameters cannot be optimized separately; each affects the other adjustable properties of the display.

The performance of the resonant microcavity can be described by the Q of the cavity. The Q of the cavity is given by the microcavity center frequency divided by the linewidth of the microcavity resonance:

$$Q = \frac{\nu}{\Delta\nu}$$

where $\nu$ is the microcavity resonance frequency and $\Delta\nu$ is the linewidth of the cavity resonance. The cavity Q is determined primarily by the reflectance of the two reflectors, the resonator design, the asymmetry in the reflectance and any imperfections in the cavity. These imperfections typically result from defects in the crystal structure of the thin films which scatter light out of the cavity in a non-useful manner. The Q can be measured empirically using an optical spectrometer.

As the cavity Q increases, the display brightness and efficiency increases. In addition, the angular spread of the light decreases and the linewidth shrinks altering the chromaticity. Note that as the spatial distribution of the light narrows, the amount of light in certain regions decreases. Depending on the display application, this effect may or may not be desirable. For the range of the current display applications, the engineered cavity Q will typically vary between 10 and 10,000. The above effects can be determined experimentally by measuring the light intensity as a function of solid angle for resonant microcavities with different Q values. Using this data, one can predict the required Q for a given application.

For most current applications, only one side of the luminescence screen is viewed. In these applications one should choose reflectors with asymmetric reflectivity such that the display preferentially forces the light out the cavity towards the viewer.

The resonator design directly affects the Q and mode volume. The latter term describes the actual volume of the activator layer that is participating in producing useful light. This volume is related to the spatial distribution of the electromagnetic field within the activator layer. The design of the resonator will also determine the spatial distribution of usable light. Due to the relatively straightforward construction, the simplest design is a planar resonator.

A primary design specification of the RMD is the chromaticity of the emitted light. The center frequency and linewidth of the cavity must be engineered so that the RMD displays this color of light.

Once these parameters are selected, the phosphor must be selected. The phosphor will need to have a natural luminescence resonance that overlaps the cavity resonance. As the resonance narrows and the overlap increases, the display efficiency and brightness increase. A compromise between chromaticity and other parameters may be required to optimize a display for a specific application.

The intensity of light emitted by the phosphor is related to the activator concentration: as the concentration increases, the intensity of emitted light increases. The activator concentration, however, is often limited by non-radiative energy transfer between activators that quenches luminescence. These quenching effects are concentration dependent. The quenching concentration varies from phosphor to phosphor, depending on the magnitude of various energy transfer parameters between activators. Cavity QED theory predicts that there may be an effect on these parameters since they relate to spontaneous emission characteristics. Thus, another potential advantage of the RMD is that energy transfer between activators may be suppressed and phosphors could contain higher concentrations of activators than was previously possible, without losing efficiency.

The display properties also depend upon the thickness of the active region. For a selected resonance, there are several active region thicknesses that produce a predetermined frequency. The range of thickness depends on the mirror construction. As the thickness increases, the number of potentially excited activators increases. With sufficient excitation energy, the total luminescence can be increased with a wider active region. However, the thickness alters the spatial distribution in a highly complex manner. The angular spread of the light changes, with additional regions of high intensity appearing at angles that are not normal to the plane of the microcavity.

Another key parameter in the resonant microcavity design is the area of the emitting surface. Some applications will require one large-area surface for the production of monochromatic light, while other designs will need pixel-sized cavities capable of producing red, green and blue light. The size of the pixel will be determined by the resolution requirements of the display.

One other important parameter is the excitation source and intensity. The display application will dictate the excitation source. The decision process in selecting the phosphor must also consider the efficiency of converting the excitation energy into useful luminescence. This efficiency is well documented for the registered phosphors, but can easily be experimentally determined. The intensity of the source will primarily change the brightness.

It should be noted that in considering the above design parameters, the light properties of the display must not reach the degree of coherence associated with a laser. To avoid this problem, particular attention must be paid to the cavity Q, the activator concentration and the excitation intensity.

The RMD can be embodied using cathodoluminescence which results from an electron beam bombarding of the phosphor. One example of a device which employs cathodoluminescence is a projection television. This application requires the highest intensities possible because it requires a wide viewing area and uses a light dispersing screen. In this application, the resonant microcavity display is incorporated in a CRT.

Full color projection televisions require three separate CRT's: one for each primary color. In this application, the RMD is superior to conventional methods because it allows intense excitation loading of the phosphor, highly directional output, controlled chromaticity, and high external efficiency. Therefore the RMD allows the use of relatively compact CRT's while maintaining high luminescence.

The phosphor is excited by electrons emitted from the electron gun, accelerated to a speed such that most of them will pass through the aluminum layer and penetrate the resonant microcavity to the depth of the phosphor. The high energy electrons excite electrons in the phosphor from the valence band into the conduction band. This additional energy is trapped at the impurity. The impurity then relaxes by emitting visible light. The aluminum layer channels away the electrons deposited in the microcavity by the excitation beam.

The reflectors can be either dielectric or metallic. The back reflector has a higher reflectivity than the front reflector, so that light, emitted by the phosphor, exits the cavity through the front reflector, perpendicular to the plane of the thin film device. The Q and the reflector asymmetry of the microcavity determines the percentage of light that exits the resonator through the front reflector.

The width of the active region determines the directionality of the light and is chosen so that its optical path length, i.e, the product of the distance between the back reflector and the front reflector and the index of refraction of the phosphor material, equals an integer multiple of the desired wavelength divided by 2 or 4 depending on the index of the adjacent layers. These dimensions ensure that a standing wave builds up between the back-reflector and the front reflector.

The wavelength of the emitted light is determined by the resonant wavelength of the microcavity. The emitted photons feed the standing wave in the microcavity.

A dielectric, or Bragg, reflector consists of alternating layers of material with high and low indices of refraction. The number of layers determines the reflectivity of the reflector. The reflectivity (R) of the reflectors can be calculated using the following equation:

$$R = \frac{1 - \left(\frac{n_H}{h_L}\right)^{N-1} \times \frac{n_H^2}{n_S}}{1 + \left(\frac{n_H}{n_L}\right)^{N-1} \times \frac{n_H^2}{n_S}}$$

where $n_H$ and $n_L$ are the refractive index of the high and low index of refraction materials, respectively; $n_s$ is the index of refraction of the substrate and N is the total number of layers in the stack. This equation is valid for normal incidence. The width of each layer is equal to an odd integer multiplied by the desired wavelength of light to be emitted divided by the quantity 4 times the index of refraction of the material used in the layer.

The Q of the cavity can be calculated once the reflectivity is determined for both reflectors. The equation that relates Q to reflectivity is given by:

$$Q = \frac{2\pi n \nu}{c(\alpha - \frac{1}{l}\ (\ln \sqrt{R_1 R_2}\ )}$$

where $\nu$ is the microcavity resonance frequency, n is the index of refraction of the phosphor, $\alpha$ is the average distributed loss constant, 1 is the width of the activator layer, $R_1$ is the reflectance of the front mirror and $R_2$ is the reflectance of the back mirror. The constant $\alpha$ is needed to account for the non-ideal behavior of the cavity that results from imperfections and spurious absorption.

The parameters chosen to optimize this display depend on the required brightness of the display and the directionality of the beam. In the typical projection television application, the display should be highly directional and bright. For each color, the cavity Q can be optimized empirically by measuring the total intensity emitted in the useful direction as a function of the electron beam current. This efficiency measurement is common in the television design art.

Figure 3:
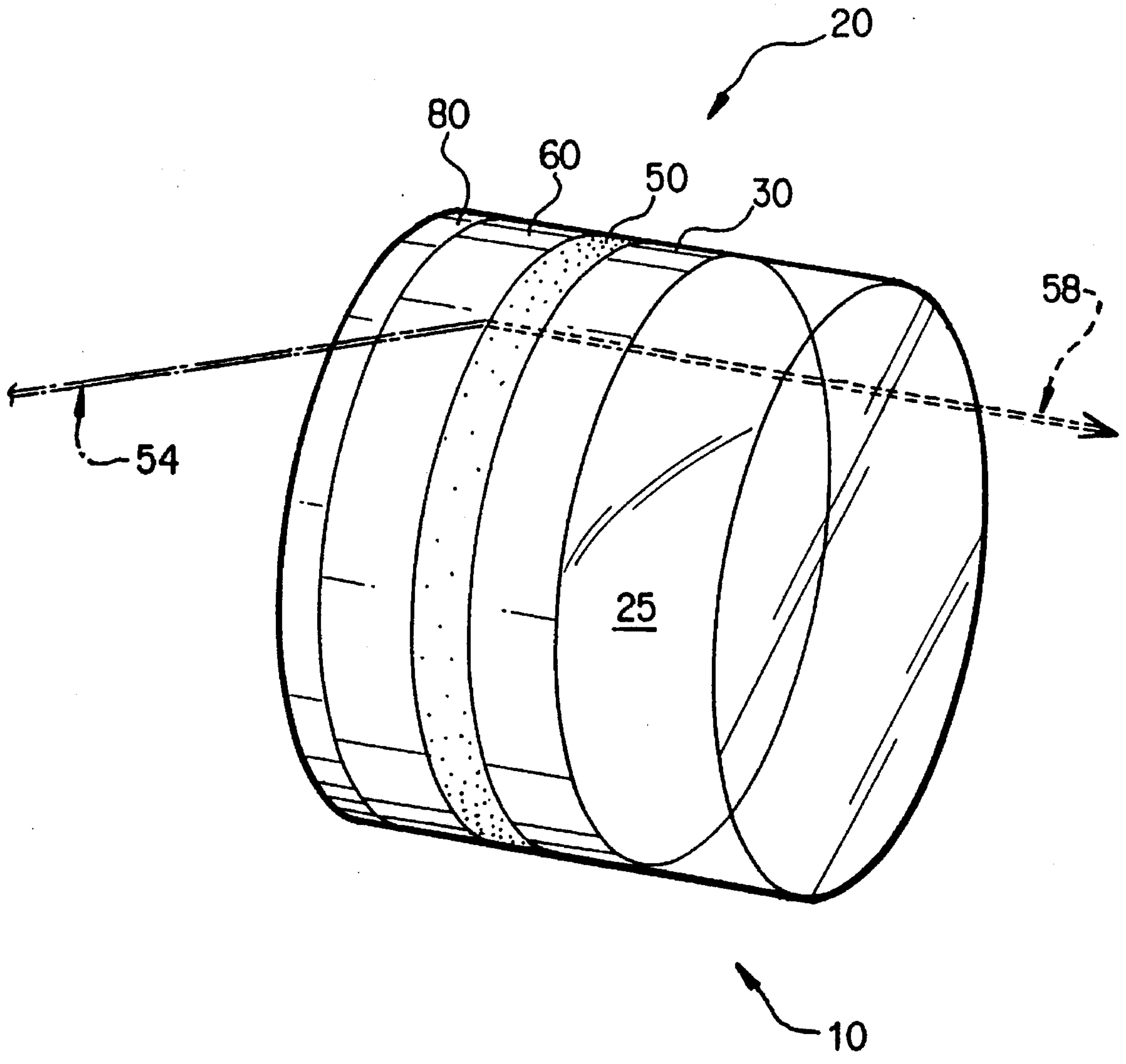
FIG. 3 is a drawing of one illustrative embodiment of an RMD designed for cathodoluminescent excitation.

FIG. 3 shows one illustrative embodiment designed for cathode luminescence. The subject invention 10 comprises a resonant microcavity 20 grown on a rigid transparent substrate 25. A layer of aluminum 80 is disposed next to the microcavity 20 to channel off electrons deposited by the electron beam and to provide an additional reflective surface. The resonant microcavity 20 is grown onto the substrate 25 using molecular beam epitaxy (MBE) or any suitable method of solid-state fabrication. Some methods of growth known to the art (e.g., LPE at its current level of development) are not suitable because they cannot be controlled with the precision necessary to grow a correctly sized microcavity. The active region 50 is excited by electrons from an electron beam 54 entering through the aluminum layer 80 and back reflector 60. The light 58 created in the active region exits through the front reflector 30 and the substrate 25.

Figure 4:
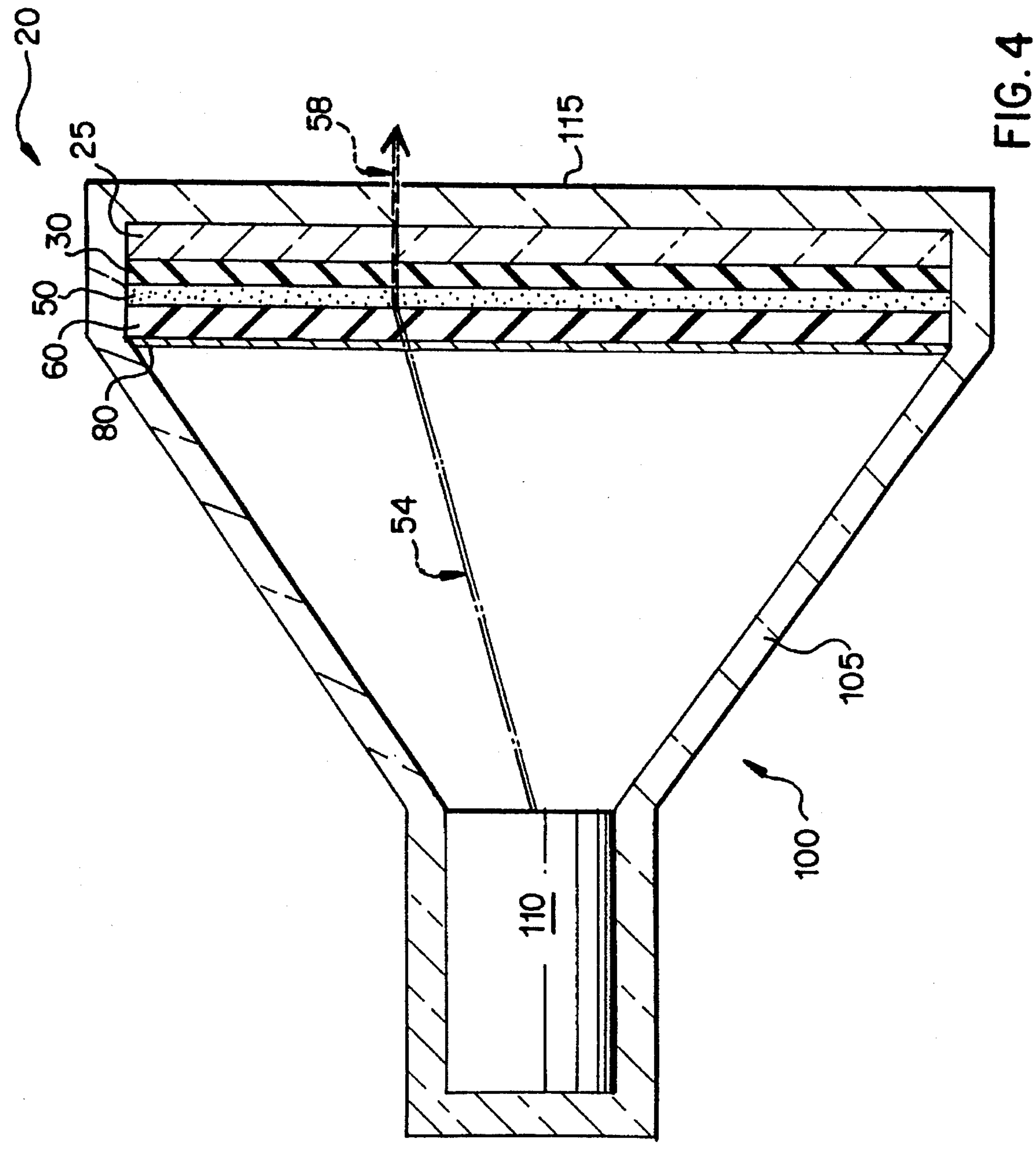
FIG. 4 is a drawing of an RMD embodied in a cathode ray tube.

As seen in FIG. 4, this embodiment can be embodied in a cathode ray tube (CRT) 100 comprising a glass vacuum tube 105 enclosing an electron gun (which is a means to generate an electron beam) 110 aimed at a flat viewing surface 115 and distal from the electron gun 110; and a phosphor-based resonant microcavity 20 disposed parallel to the flat viewing surface 115 inside the vacuum tube 105. This embodiment is configured to produce monochromatic light.

Figure 5:
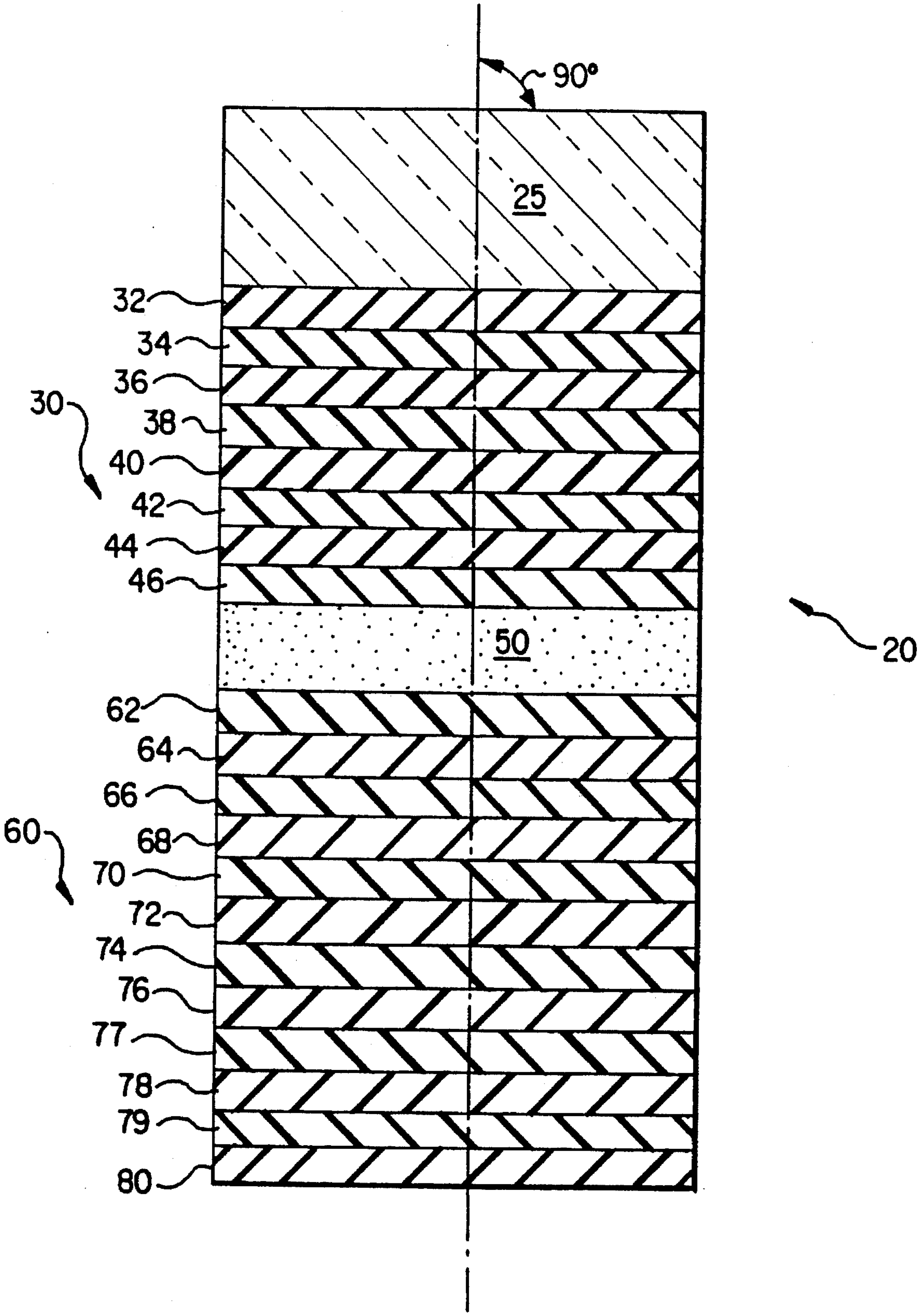
FIG. 5 is a drawing of an experimental embodiment designed to emit light through the front reflector with a wavelength of 530 nanometers.

As shown in FIG. 5, an experimental embodiment designed to emit light through the front reflector with a wavelength of 530 nanometers, the material used in the active region 50 is zinc sulfide (ZnS) doped with manganese (Mn) at a dopant concentration of 2%. The thickness of the active region 50 is 110 nanometers and the phosphor has an index of refraction of n=2.4.

In the front reflector 30, the material used in the layers with a relatively high index of refraction 32, 36, 40 and 44 is ZnS, and the material used in layers with a relatively low index of refraction 34, 38, 42 and 46 is calcium fluoride ($CaF_2$). In the back reflector 60, the material used in the layers with a relatively low index of refraction 62, 66, 70, 74, 77, and 79 is $CaF_2$, and the material used in the layers with a relatively high index of refraction 64, 68, 72, 76, and 78 is ZnS. All of the high-index ZnS layers are 55 nanometers thick with an index of refraction of n=2.4. All of the low-index $CaF_2$ layers are 95 nanometers thick with an index of refraction of n=1.4.

The substrate 25 is made of $CaF_2$. It is 2 millimeters thick and has an index of refraction of n=1.4. The aluminum layer 80 is 50 nanometers thick.

The microcavity 20 is grown on the substrate 25 using MBE and the aluminum layer 80 is deposited using vapor-phase deposition.

The front reflector has a reflectivity of R=97.5% with 8 layers and the back reflector has a reflectivity R =99.9% with 12 layers including the aluminum layer. Because the back reflector is more reflective than the front mirror almost all of light produced in the cavity exits through the front reflector. (The exact amount will depend on the cavity Q and the asymmetry of the reflectors.)

Figure 6:
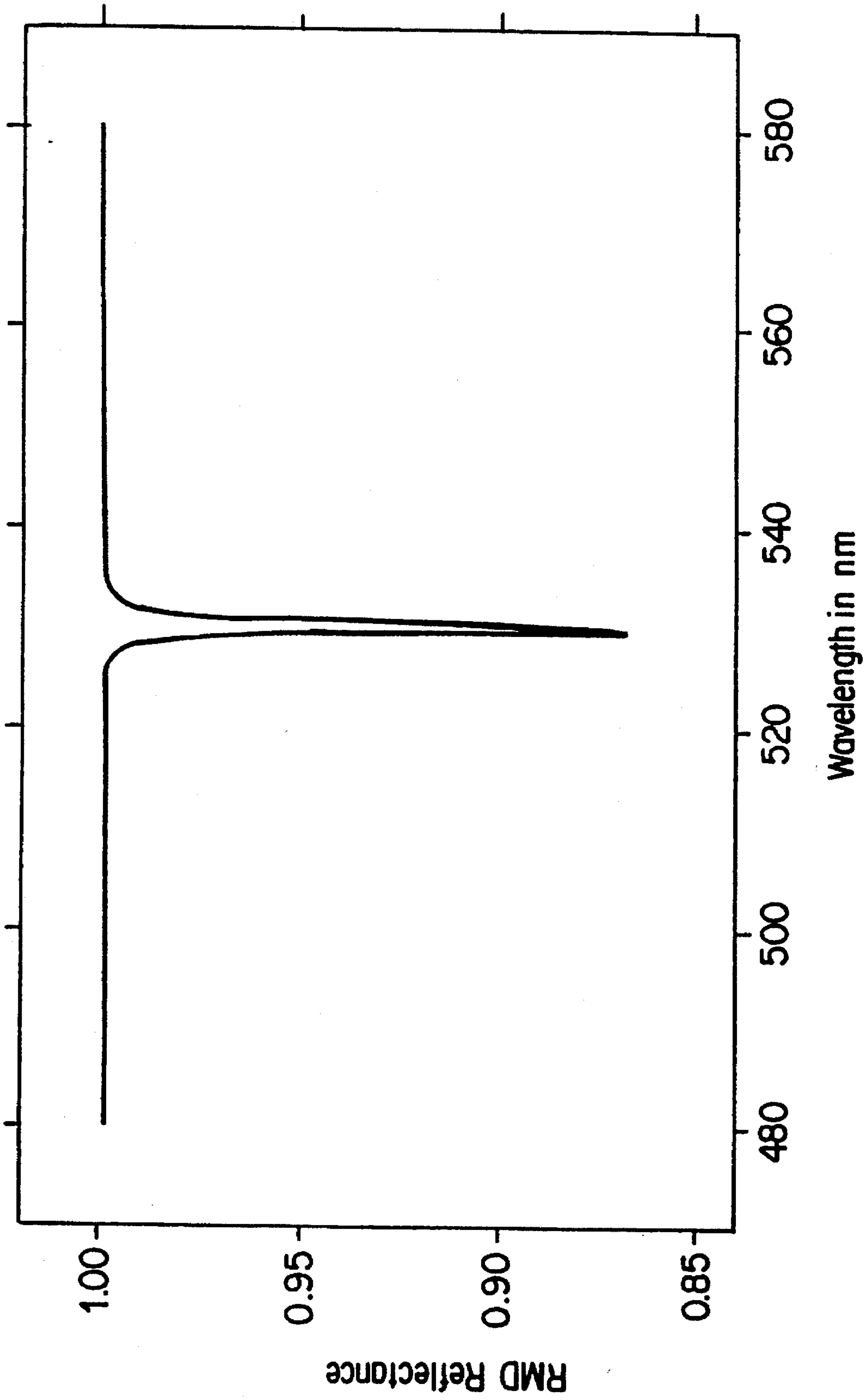
FIG. 6 is a graph relating the reflectance of the RMD as a function of the wavelength of the incident light in an experimental embodiment designed to emit light through the front reflector with a wavelength of 530 nanometers.

As shown in FIG. 6, the reflectance of the RMD is a function of the wavelength of the incident light. At the resonance wavelength of 530 nm, the reflectance dips to roughly 86%—indicating that the RMD will transmit this wavelength. At all other wavelengths the reflectance is near 100%—indicating that the RMD will not transmit light at non-resonance wavelengths. This reflectance behavior is due to the fact that the cavity can only support a standing wave of a wavelength equal to the resonance wavelength of the cavity.

Figure 7:
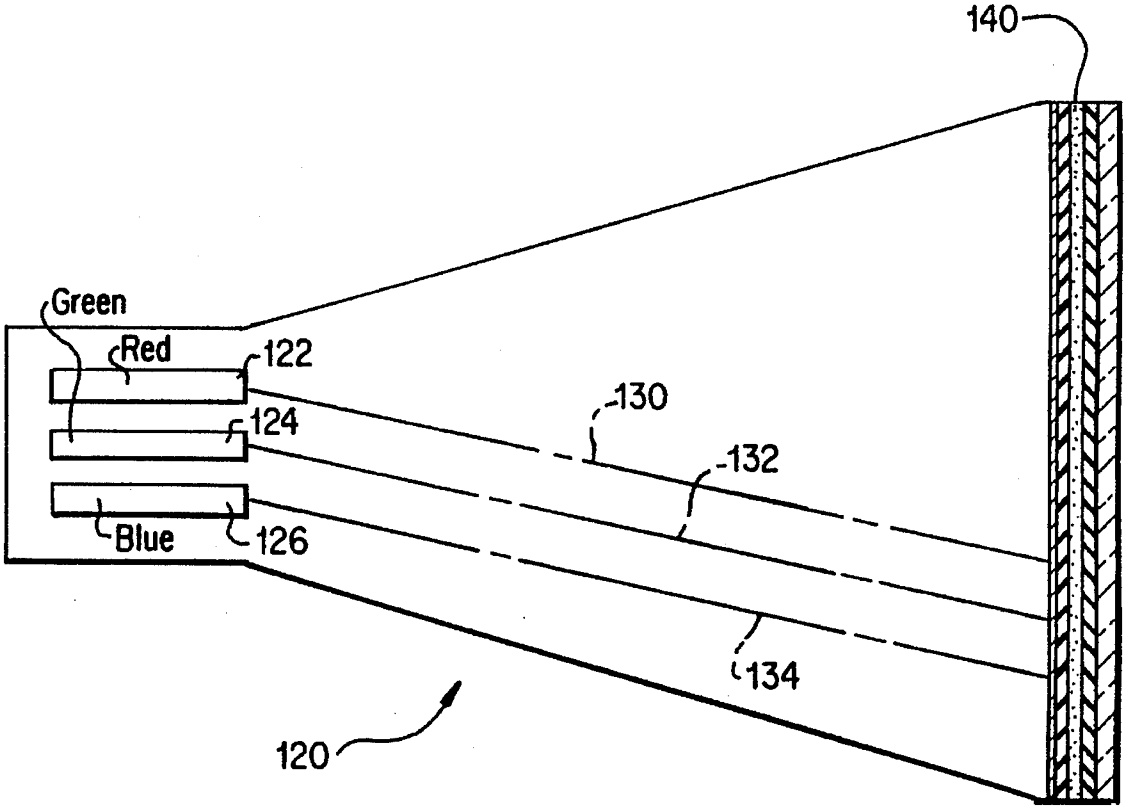
FIG. 7 is a drawing of a direct view color television using a RMD.

In another embodiment, the RMD can be used in a CRT as a direct view television. FIG. 7 depicts a direct view color television. The CRT 120 is similar to the one described in the projection television embodiment, except that it has three electron guns, 122, 124 and 126 one for each primary color. Each of the electron guns produces a separate electron beam, 130, 132 and 134, corresponding to the desired intensity of each color. The electron beams excite a screen 140 on the viewing surface of the CRT.

Figure 8A:
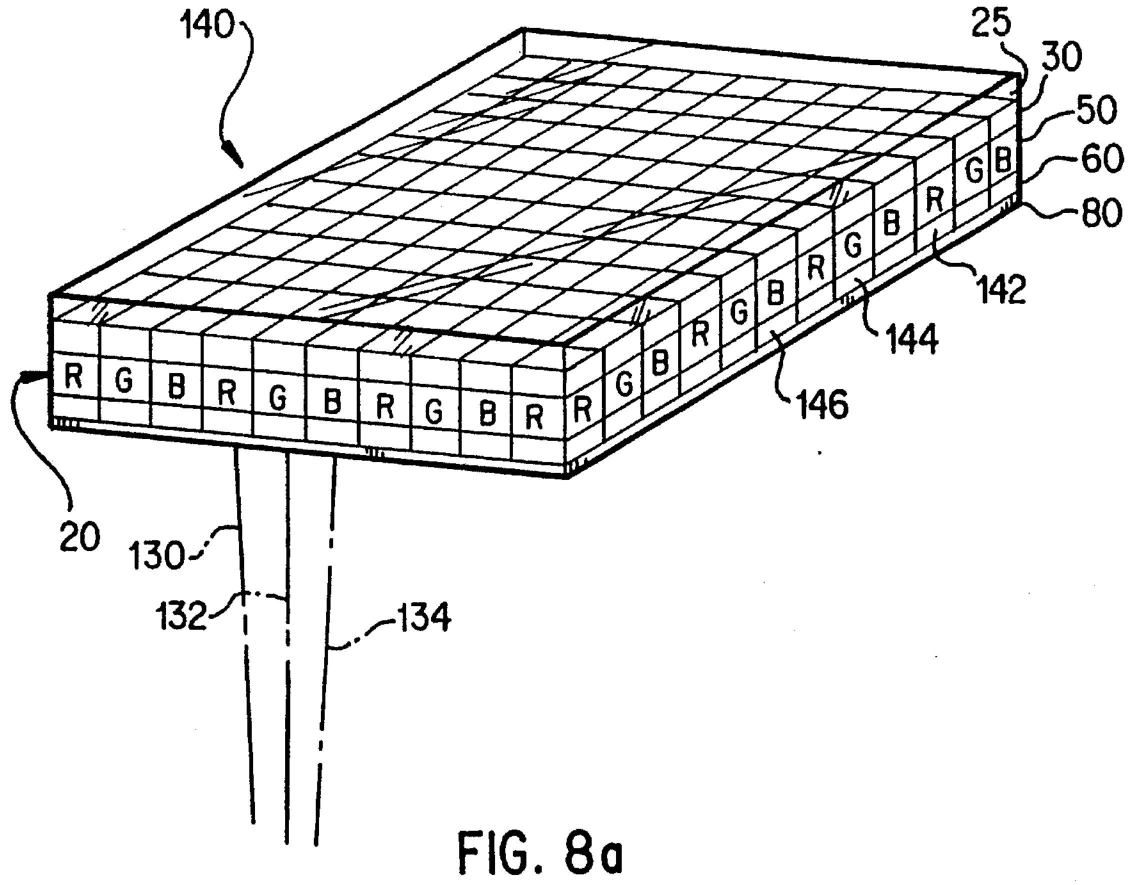
Figure 8B:
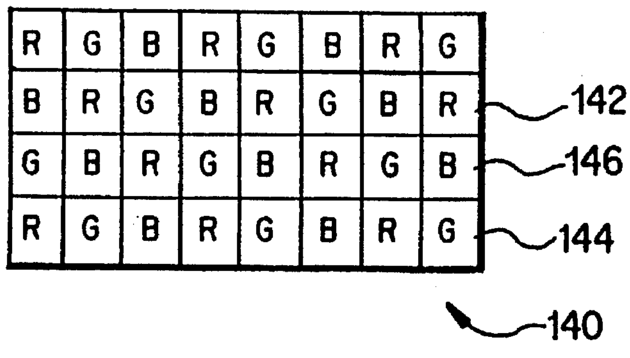

As seen in FIG. **8*a*, the screen 140 comprises of an array of pixel-sized microcavities 20. The array contains microcavities designed to produce red light 142, green light 144 and blue light 146. The red-light pixels are excited by the "red" electron beam 130, the green-light pixels are excited by the "green" electron beam 132, and the blue-light pixels are excited by the "blue" electron beam 134. FIG. 8*b*** shows a front view of the array of pixels and the arrangement of colors. The design of color displays with separate color pixels is well known in the art.

In this embodiment, the light emanating from the pixel produces the required angular distribution. One could also envision an embodiment in which a lens is used to achieve this display requirement allowing for the maximum efficiency to be produced by the resonant microcavity.

The construction of the pixel is fundamentally the same as that described in the embodiment for a projection television. The primary difference is the size of the surface area and the angular spread of light required. In this case, the surface area is determined not by brightness, but by the resolution required by the application. High definition television, medical and military applications typically require the pixel size to be smaller than 25 microns. This requirement cannot be met using current technologies, but can be satisfied by using a RMD.

With the resolution and angular distribution specified, the resonant microcavity display must be optimized for each color. This optimization will use the above-described empirical method of measuring the total light produced versus beam current. The restrictions of the design due to the specification mean that obtaining the maximum light output is primarily a function of the phosphor activator. In the embodiment in which a lens is placed outside the cavity, one has much more freedom in engineering the cavity. Without the restriction on the angular distribution, the cavity Q can be easily tailored.

In addition, the RMD can be embodied in an electroluminescent display. In this display application, a RMD is sandwiched between two metal conductors. A voltage signal is applied to the conductors and thereby induces what is termed thin film electroluminescence (TFEL). An array of pixel-size elements is constructed to form a luminescent screen creating a TFEL flat panel display.

Flat panel displays are most frequently used for a narrow viewing angle as in the case of lap-top computers. In this embodiment, the resonant microcavity display is similar to the direct view television application. The restriction, however, to produce the large angular spread of the light has been removed.

This embodiment would comprise an array of pixels, where each pixel would be an electrically activated microcavity. FIG. 9 shows one pixel in the array 160. The pixel comprises a visibly transparent substrate 162, a layer of Indium doped Tin Oxide (ITO) 164 (a transparent metal) acts as ground, and a resonant microcavity 166. The resonant microcavity 166 comprises a front reflector 168, a phosphor-based active region 170 and a back reflector 172. Disposed next to the back reflector 172 is an aluminum layer 174, which is deposited on each microcavity in such manner that each cavity is electrically isolated.

This display would be excited by applying a voltage to the aluminum layer 174 of the pixel microcavity 166. The addressing of pixels is common in the art of flat panel display design.

This display would be optimized by measuring the amount of usable light emitted versus the electric field intensity. Particular attention must be paid to the phosphor selected since (in this embodiment) the electroluminescence efficiency is important.

Also, the RMD could be embodied as an array of pixels in a flat panel display which uses ultra-violet light to excite the phosphor. As seen in FIG. 10, each pixel 180 would comprise a plasma discharge lamp 182 that generates ultra-violet light which passes through a back reflector 184 and excites the active region 186 (i.e., the phosphor). The emitted light then passes out of the display through the front reflector 188 and the substrate 190.

The RMD could also be used in a reverse configuration to absorb light and generate an electric signal. The physics that yields the enhanced emission of light demonstrated in the above display also produces enhanced absorption. The light energy has to be converted into electric energy. To do this, materials other than phosphors might be more useful.

The unique ability of an RMD to influence the emission characteristics may also be used in memory storage devices. As explained earlier, the confinement of an optical material in a resonant microcavity affects the decay rate. Depending on whether the cavity is in resonance with the transition energy of the optical material or not, the lifetime is either decreased or increased. It is therefore possible to significantly enhance the lifetime of the material and to use this effect to store information.

Another possible way to store information with a resonant microcavity would be based on hole burning. This process and its application for the storage of information is well known. By putting the material in a resonant microcavity one could not only use the enhanced absorption but also the earlier described effect of increased lifetime to make the hole burning process more efficient.

RMDs could also be used in the design of light valves. This would require two RMD's. One RMD without a phosphor would be grown on top of a RMD with a phosphor. The first RMD would modulate the intensity of the light emanating from the second RMD. The modulator would work by tuning the first RMD to its resonant frequency or tune it away from its resonant frequency. The process of tuning the first RMD (using the electro-optic or the piezo-electric effect) would be achieved by applying a voltage to the first RMD. This modulator could also be used as a switch by turning the light completely on and completely off.

Using RMD's in a Plasma Display Panel could also be used to build a fluorescence lamp. Compared to common fluorescence lamps the RMD lamp has the advantage of strongly enhanced fluorescence which results in a greater efficiency. A single RMD lamp would emit light of a certain wavelength. This is useful for applications such as stage-lamps. Common stage lamps emit over the UV, the visible and the infrared region and use filters to select a certain wavelength (color). This filter-process makes the lamp very inefficient since most of the light is not allowed to exit the lamp. In contrast, the RMD lamp creates only light of a certain wavelength and does therefore not require a filter. The efficiency is therefore much higher. The combination of a R, G and B device would result in a white light source.

The above embodiments are given as illustrative examples and are not intended to impose any limitations on the invention.

What is claimed is:

1. A luminescent display, comprising a thin-film resonant microcavity with an active region, said active region having a phosphor disposed therein for emitting light.

2. The luminescent display of claim 1 wherein said microcavity comprises:

a. a rigid substrate;

b. a front reflective region disposed upon said substrate;

c. said active region disposed upon said front reflective region; and d. a back reflective region disposed upon said active region; and at least one of said front and said back reflective regions is partially reflective, so that light produced by excitation of said active region forms a standing wave between said front reflective region and said back reflective region and is emitted through said at least one partially reflective region.

3. The luminescent display of claim 2 wherein said rigid substrate comprises a material that is transparent.

4. The luminescent display of claim 2 wherein said rigid substrate is crystalline.

5. The luminescent display of claim 2 wherein said rigid substrate is amorphous.

6. The luminescent display of claim 2 wherein said front reflective region and back reflective region are dielectric reflectors.

7. The luminescent display of claim 6 wherein said dielectric reflectors further comprise a plurality of alternating parallel layers wherein layers comprising a material with a relatively low index of refraction alternate with layers comprising a material with a relatively high index of refraction.

8. The luminescent display of claim 7 wherein said material with a relatively low index of refraction is selected from fluorides and oxides.

9. The luminescent display of claim 7 wherein said material with a relatively high index of refraction is selected from sulfides, selenides, nitrides, and oxides.

10. The luminescent display of claim 2 wherein said front reflective region is a metallic reflector.

11. The luminescent display of claim 2 wherein said back reflective region is a metallic reflector.

12. The luminescent display of claim 2 wherein said active region comprises a phosphor selected from sulfides, oxides, silicates, oxysulfides, and aluminates.

13. The luminescent display of claim 2 wherein said active region comprises an activator selected from transition metals, rare earths and color centers.

14. The luminescent display of claim 2 wherein the distance between said front reflective region and said back reflective region is equal to the desired wavelength of light to be emitted by the display multiplied by an integer and divided by the quantity 4 times the index of refraction for light of the desired wavelength of the material used in the active region.

15. The luminescent display of claim 2 wherein the distance between said front reflective region and said back reflective region is equal to the desired wavelength of light to be emitted by the display multiplied by an integer and divided by the quantity 2 times the index of refraction for light of the desired wavelength of the material used in the active region.

16. The luminescent display of claim 2 disposed upon the viewing screen of a cathode ray tube.

17. The luminescent display of claim 2 further comprising a conductive layer disposed upon said back reflective region to channel off electrons.

18. The luminescent display of claim 1 wherein said phosphor is excited by electrons.

19. The luminescent display of claim 17 further comprising a cathode ray tube to generate said exciting electrons.

20. The luminescent display of claim 1 wherein said phosphor is excited by an electric field.

21. The luminescent display of claim 1 wherein said phosphor is excited by light.

22. The luminescent display of claim 21 wherein said conductive layer is made of aluminum.

23. The luminescent display of claim 1 wherein said phosphor is selected to have a controlled excited-state decay time.

24. A method of producing a luminescent display, which comprises growing a resonant microcavity, including a phosphor active region inside said microcavity, on a rigid substrate.

25. The method of claim 24 wherein said phosphor is selected to control the phosphor decay time.

26. The method of claim 24 wherein said active region has a width selected to control the chromaticity of the light emitted from the display.

27. The method of claim 26 wherein the width of said active region is selected so that it is equal to an integer number of quarter wavelengths of light corresponding to a selected chromaticity.

28. The method of claim 26 wherein the width of said active region is selected so that it is equal to an integer number of half wavelengths of light corresponding to a selected chromaticity.

29. The method of claim 24 wherein said microcavity has a width selected such that the microcavity has a resonance frequency that lies within the phosphor's natural luminescence resonance.

30. The method of claim 24 wherein said rigid substrate is selected to maximize the heat transfer efficiency of the display.

31. The method of claim 24 wherein said microcavity is designed to control the directionality of the light emitted from the display.

* * * * *